United States Patent
Troxel, Jr. et al.

(10) Patent No.: US 10,163,151 B2
(45) Date of Patent: *Dec. 25, 2018

(54) SYSTEM AND METHOD OF UTILIZING A DISTRIBUTED ORDER BOOK IN AN ELECTRONIC TRADE MATCH ENGINE

(75) Inventors: Charlie Troxel, Jr., Naperville, IL (US); Steve Goldman, Lake Forest, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 878 days.

This patent is subject to a terminal disclaimer.

(21) Appl. No.: 13/300,163

(22) Filed: Nov. 18, 2011

(65) Prior Publication Data

US 2012/0066114 A1    Mar. 15, 2012

Related U.S. Application Data

(63) Continuation of application No. 12/841,781, filed on Jul. 22, 2010, now Pat. No. 8,082,206, which is a continuation of application No. 11/183,393, filed on Jul. 18, 2005, now Pat. No. 7,788,163.

(60) Provisional application No. 60/661,144, filed on Mar. 11, 2005.

(51) Int. Cl.
   *G06Q 40/00*    (2012.01)
   *G06Q 40/02*    (2012.01)
   *G06Q 40/04*    (2012.01)

(52) U.S. Cl.
   CPC .......... *G06Q 40/00* (2013.01); *G06Q 40/025* (2013.01); *G06Q 40/04* (2013.01)

(58) Field of Classification Search
   CPC .................................................. G06Q 40/00

USPC ...................................................... 705/35–45
See application file for complete search history.

(56) References Cited

U.S. PATENT DOCUMENTS

| | | | |
|---|---|---|---|
| 7,401,104 B2 * | 7/2008 | Shah ................ | G06F 17/30575 707/620 |
| 7,512,638 B2 * | 3/2009 | Jhaveri ............ | G06F 17/30206 |
| 7,539,638 B1 * | 5/2009 | Keith .................... | G06Q 40/00 705/35 |

(Continued)

FOREIGN PATENT DOCUMENTS

| | | |
|---|---|---|
| JP | H07506916 | 7/1995 |
| JP | 2003522345 | 7/2003 |

(Continued)

OTHER PUBLICATIONS

Supplementary European Search Report from EP 06 72 0854 dated Aug. 2, 2010, 7 pages.

(Continued)

*Primary Examiner* — Abhishek Vyas
(74) *Attorney, Agent, or Firm* — Banner & Witcoff, Ltd.

(57) ABSTRACT

Methods and systems are providing for minimizing the effects of transmission delays when providing orders for financial instruments. A plurality of order books and match engines may be maintained at geographically dispersed locations. The orders may be synchronized to provide the appearance of a single order book to traders and other users. The plurality of order books and match engines allow traders and other users to transmit orders to the match engine associated with the shortest transmission delay and to access orders pending at other match engines.

16 Claims, 5 Drawing Sheets

(56) References Cited

U.S. PATENT DOCUMENTS

| | | | | |
|---|---|---|---|---|
| 7,788,163 | B2* | 8/2010 | Troxel, Jr. | G06Q 40/00 |
| | | | | 705/37 |
| 7,792,733 | B1* | 9/2010 | Keith | G06Q 40/00 |
| | | | | 705/35 |
| 8,380,609 | B2* | 2/2013 | Keith | G06Q 40/04 |
| | | | | 705/37 |
| 2002/0026321 | A1 | 2/2002 | Faris et al. | |
| 2003/0050888 | A1 | 3/2003 | Satow et al. | |
| 2003/0097328 | A1 | 5/2003 | Lundberg et al. | |
| 2004/0068461 | A1 | 4/2004 | Schlutter | |
| 2005/0097026 | A1* | 5/2005 | Morano | G06Q 40/04 |
| | | | | 705/37 |
| 2010/0138334 | A1* | 6/2010 | Warsaw | G06Q 40/04 |
| | | | | 705/37 |

FOREIGN PATENT DOCUMENTS

| | | | |
|---|---|---|---|
| WO | 0028450 A | | 5/2000 |
| WO | 0198963 A | | 12/2001 |
| WO | 2004081737 | | 9/2004 |
| WO | WO2005024626 | * | 3/2005 |

OTHER PUBLICATIONS

Office Action in CA2,600,278 dated Jul. 9, 2013.
Office Action in CA 2,600,278 dated May 3, 2012.
Translation of Japanese Office Action dated Nov. 1, 2011, JP Application No. 2008-500722, 2 pages.

* cited by examiner

SYSTEM AND METHOD OF UTILIZING A DISTRIBUTED ORDER BOOK IN AN ELECTRONIC TRADE MATCH ENGINE

The present application is a continuation of U.S. patent application Ser. No. 12/841,781, filed Jul. 22, 2010, which is a continuation of U.S. patent application Ser. No. 11/183,393, filed Jul. 18, 2005, which claims the benefit of priority to U.S. Provisional Application No. 60/661,144, filed Mar. 11, 2005. All three aforementioned applications are hereby incorporated by reference in their entirety.

FIELD OF THE INVENTION

The present invention relates to the trading of financial instruments and, in particular, to methods and systems that utilize orders that are geographically distributed.

DESCRIPTION OF THE RELATED ART

Modern financial instrument trading systems allow traders to transmit orders great distances to match engines. For example, it is common for traders in London and Singapore to transmit orders for options and futures contracts to a match engine located in the United States. When using computer devices and automated trading systems, traders located at greater distances from a match engine can be at a competitive disadvantage when compared to traders located shorter distances from the match engine.

Traders located farther away from a match engine are disadvantaged because of the time required to receive market data from the match engine and transmit orders to the match engine. For example, a trader located in London can expect an order transmitted in London to arrive at a match engine located in Chicago in about 80 milliseconds. This delay can be significant for traders using computer devices and automated trading systems that place orders in response to changes in market data. If an automated trading system located in Chicago and an automated trading system located in London respond to the same market data and transmit the same order to a match engine located in Chicago, one skilled in the art would expect the order generated by the automated trading system located in Chicago to arrive at the match engine before the order generated by the automated trading system located in London because of transmission delay. With existing systems, a trader's geographic location can cause a trader to always be at a competitive disadvantage because of transmission delays.

Therefore, there is a need in the art for trading systems and methods that minimize delays associated with the transmission of trades and market data.

SUMMARY OF THE INVENTION

Aspects of the present invention overcome problems and limitations of the prior art by providing synchronized order books that are located at geographically remote locations. The order books may be connected by a high speed data network and may exchange status messages. As used herein, a match engine or match engine module may be in the form of an instance of a match engine or match engine module.

In certain embodiments, the present invention can be partially or wholly implemented on a computer-readable medium, for example, by storing computer-executable instructions or modules, or by utilizing computer-readable data structures. Of course, the methods and systems of the above-referenced embodiments may also include other additional elements, steps, computer-executable instructions, or computer-readable data structures. In this regard, other embodiments are disclosed and claimed herein as well.

Aspects of the invention allow for the matching for a single highly active contract in a massively parallel environment. Blade servers and grid computing can be used to create a highly scalable matching environment.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein.

DETAILED DESCRIPTION OF THE INVENTION

Figure 1:
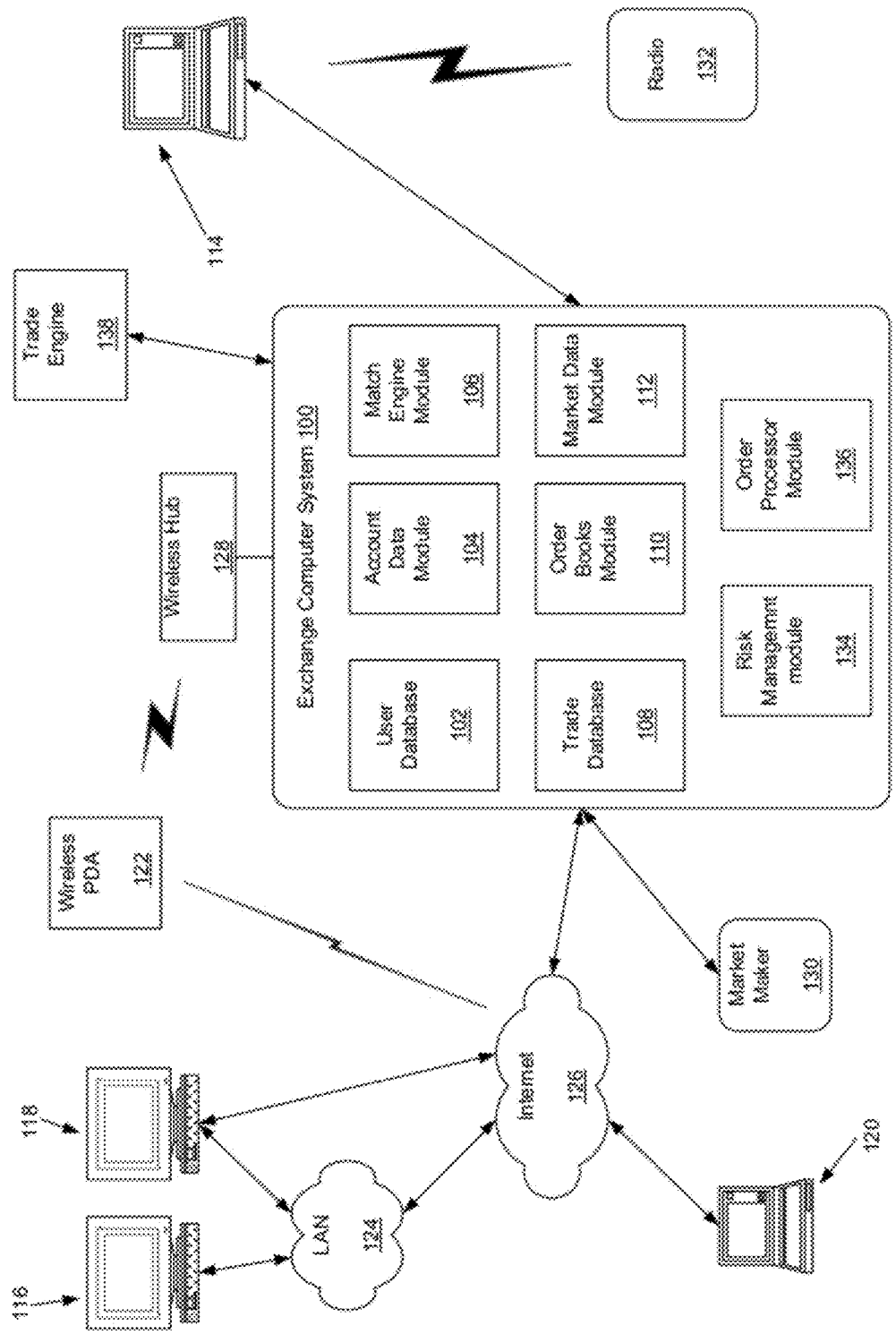
FIG. 1 illustrates a computer network system that may be used to implement aspects of the present invention.

Aspects of the present invention may be implemented with computer devices and computer networks that allow traders, exchanges and other entities to exchange trading data, such as orders and market information. An exemplary trading network environment for implementing trading systems and methods is shown in FIG. 1. An exchange computer system 100 receives orders and transmits market data related to orders and trades to users. Exchange computer system 100 may be implemented with one or more mainframe, desktop or other computers. A user database 102 includes information identifying traders and other users of exchange computer system 100. Data may include user names and passwords potentially with other information to identify users uniquely or collectively. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose variable defined derivative product and aggregate order types for processing by order book module 110 and match engine module 106.

The trading network environment shown in FIG. 1 includes computer devices 114, 116, 118, 120 and 122. Each computer device includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a telecommunications line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems. Coupling can be direct as described or any other method described herein.

The operations of computer devices and systems shown in FIG. 1 may be controlled by computer-executable instructions stored on computer-readable media. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Figure 2:
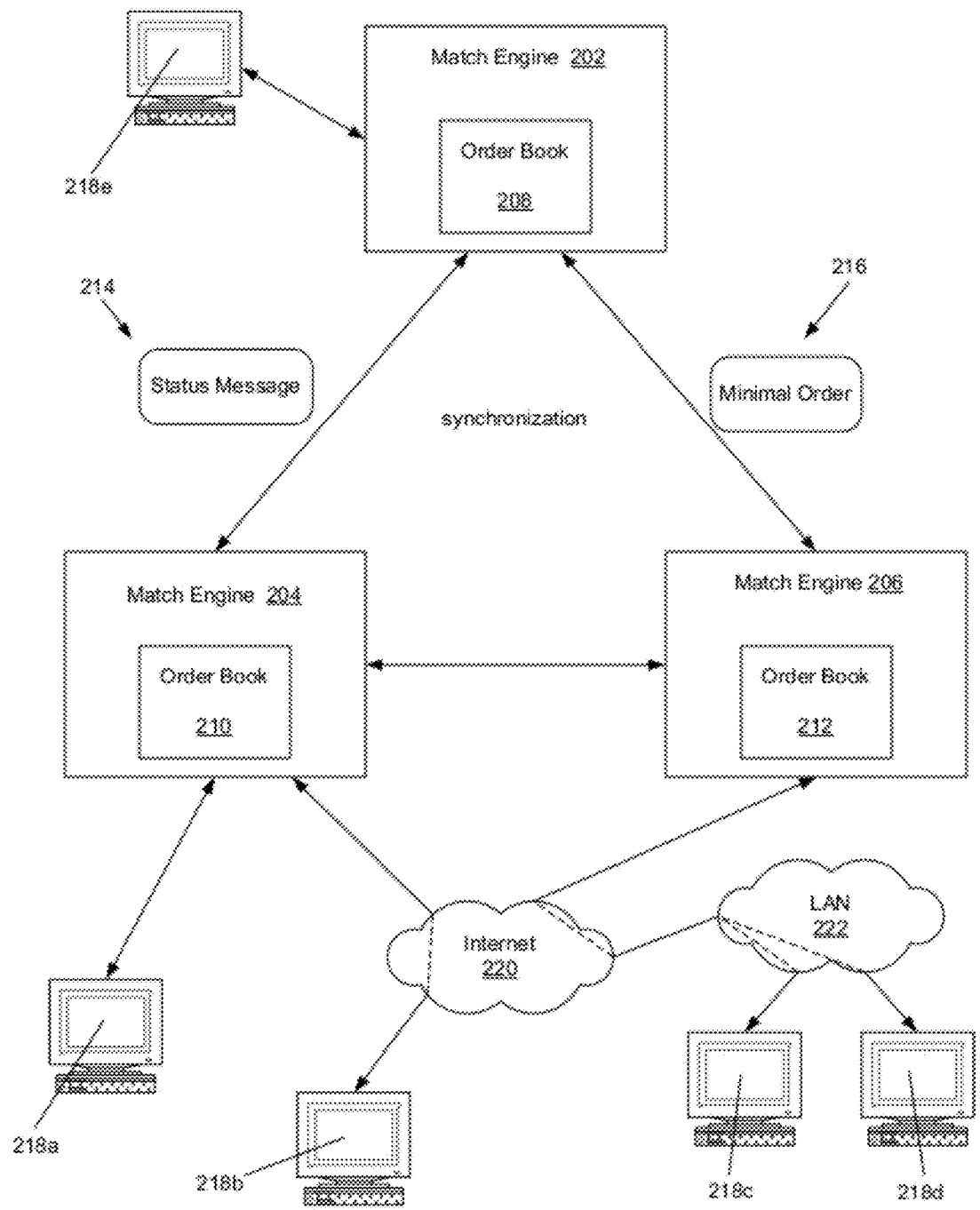
FIG. 2 illustrates a distributed order book system in accordance with an embodiment of the invention.

FIG. 2 illustrates a distributed order book system in accordance with an embodiment of the invention. A group of match engines 202, 204 and 206 are located at different locations. The locations may be remote from one another. For example, match engine 202 may be located in Chicago, match engine 204 may be located in London and match engine 206 may be located in Singapore. Each match engine may also be associated with an order book, such as order books 208, 210 and 212. Match engines 202, 204 and 206 may be connected by a high speed data network, such as a fiber optic data network. A high speed data network facilitates the exchange of status messages 214 between match engines 202, 204 and 206 that may be used to synchronize order books 208, 210 and 212.

Status message 214 may be formatted in accordance with an efficient messaging protocol. In some embodiments of the invention, the messaging protocol may use out of band signaling. Status message 214 may include the best bid and offer available at a match engine, the state of a match engine, changes made since a previous status message or other information that allows a match engine to know the state of another match engine. Status messages allow, for example, a first match engine to match a first order with a second order at a second match engine when the second match engine provides a better price.

In one embodiment of the invention an order may be matched locally at a match engine when there is not a price advantage associated with matching the order at another match engine. When an order is not matched locally, minimal order data 216 may be transmitted to one or more remote match engines so that all match engines are aware of all pending orders. Minimal order information is described in detail below. In one embodiment of the invention, minimal order information is used to synchronize match engines and status messages are not needed or used to check the integrity of data.

As is shown in FIG. 2, computer devices 218a-218e may be coupled to match engines directly, via the Internet 220, via a local area network (LAN) 222. Additional communication paths may utilize other wide area networks (WANs), radio waves, mobile terminal networks, etc. Moreover, computer devices 218a-218e may be implemented with computer workstations, laptop computers, mobile terminals, phone devices, PDAs and other devices that allow users to exchange information with a match engine. Computer devices 218a-218e may be used to transmit orders to match engines and to receive market data, confirmation of trades and other information typically distributed by a match engine or exchange.

Figure 3:
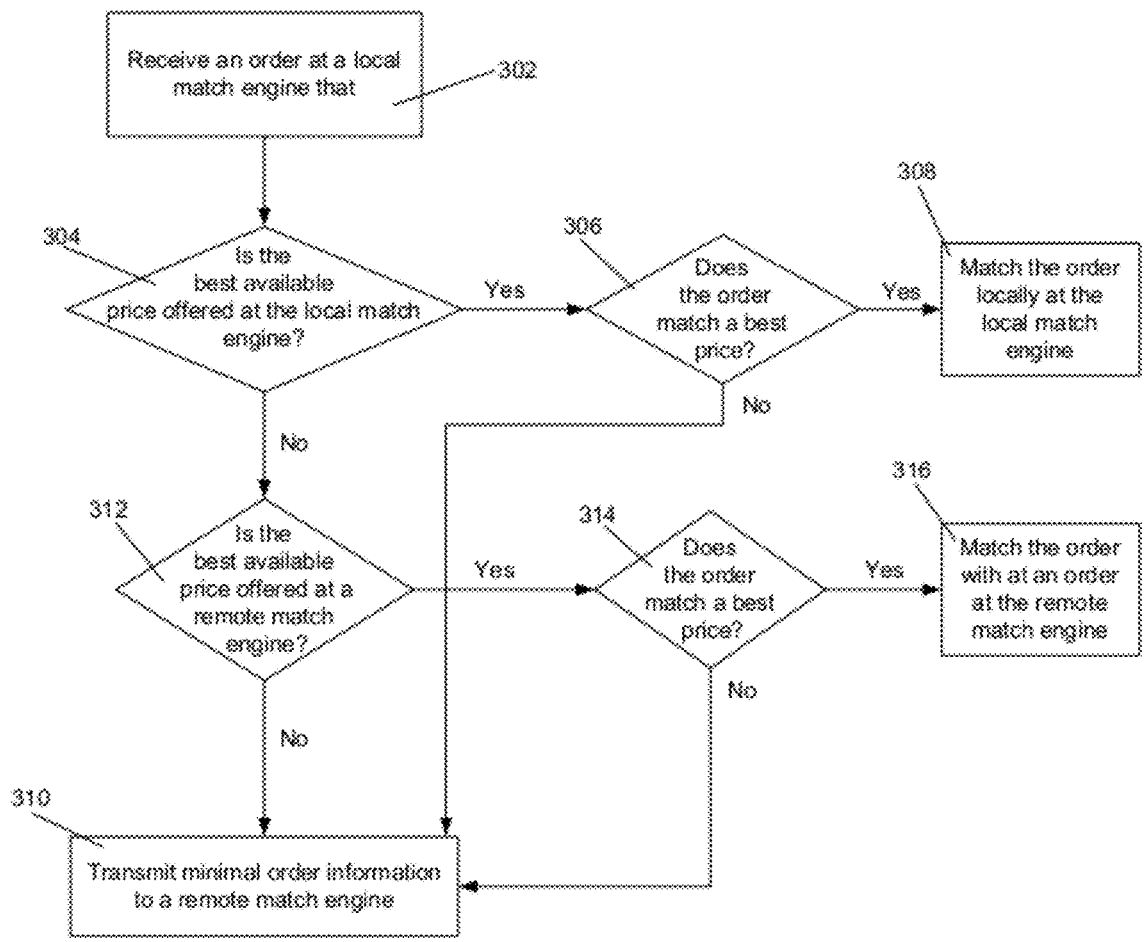
FIG. 3 illustrates a method of processing an order at a local match engine in accordance with an embodiment of the invention.

FIG. 3 illustrates a method of processing an order at a local match engine in accordance with an embodiment of the invention. In step 302 an order is received at a local match engine. A match engine may be considered to be a "local" match engine when the match engine is the shortest geographic distance to the source of an order. In an alternative embodiment of the invention, a match engine may be considered to be "local" when the transmission time for transmitting an order from a source to the match engine is the shortest time. Next, in step 304, it is determined whether the best available price is offered at the local match engine. Status messages described above allow a match engine to know the prices offered at other match engines.

If the best price is available at the local match engine, in step 306 it may be determined whether the order matches a best price. When the order does match a best price, in step 308, the order is matched at the local match engine. When the order does not match a best price, minimal order information may be transmitted to a remote match engine in step 310. Of course, step 310 may include transmitting minimal order information to two or more remote match engines when the method shown in FIG. 3 is used with systems that include three or more match engines.

In step 312 it is determined whether the best available price is offered at a remote match engine. When the best available price is not offered at a remote match engine, the method proceeds to step 310. When the best available price is offered at a remote match engine, in step 314 it is determined whether the order matches a best price. When the order does match a best price, the order is matched with an order at the remote match engine in step 316. Step 316 may be performed at the local match engine. When the order does not match a best price, the process proceeds to step 310.

While FIG. 3 illustrates a method in which match decisions are based on price, in alternative embodiments match decisions may be based on other variables, combination of variables or other factors. For example, a contractual obligation to distribute orders to market makers may impact the match decisions.

The method shown in FIG. 2 allows orders to be matched locally when possible. Orders are more likely to be matched locally with highly liquid markets. One skilled in the art will appreciate that modifications can be made to the method shown while maintaining the appearance of a single order book to traders and other users and minimizing transmission delays without departing from the invention.

Figure 4:
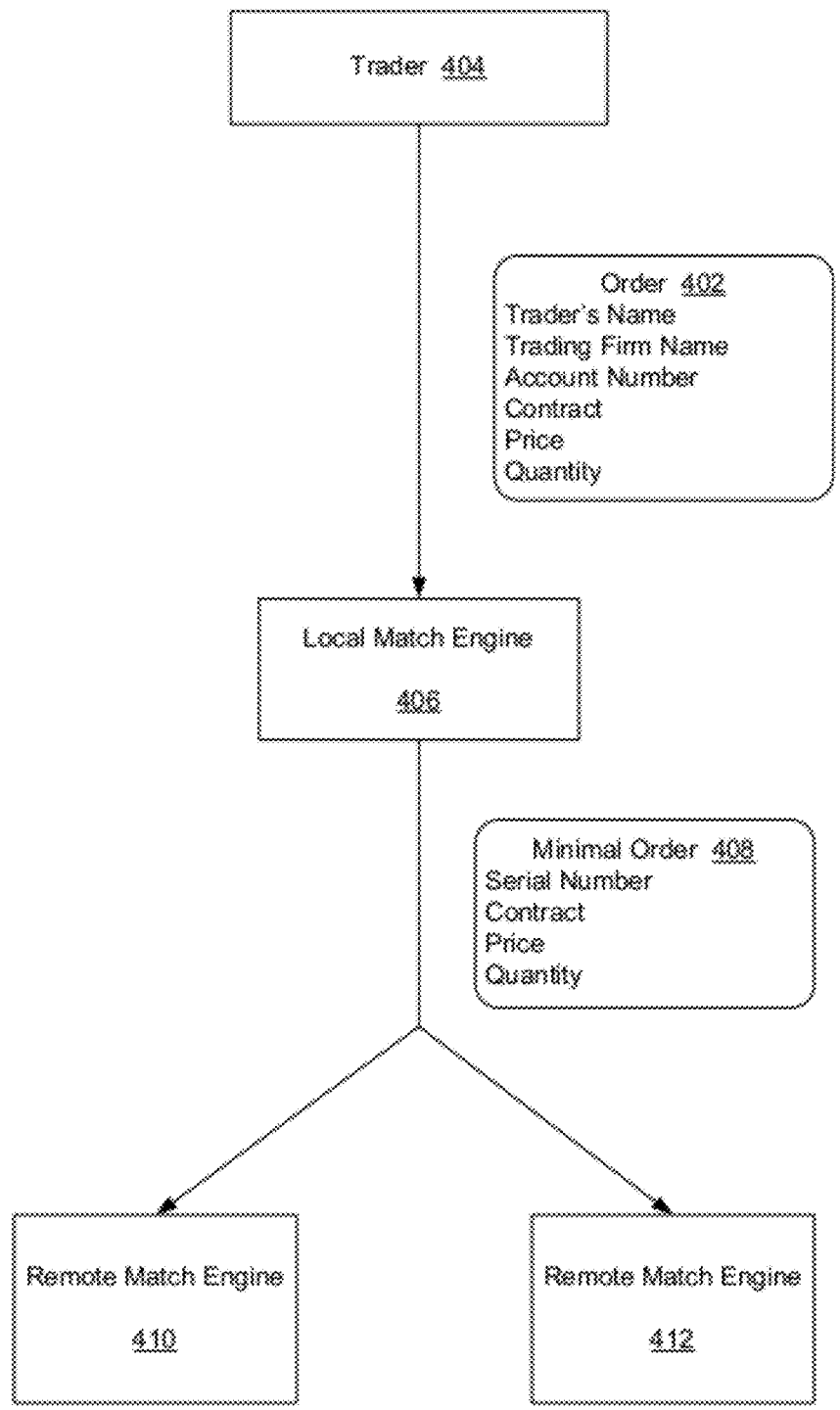
FIG. 4 shows the type of data that may be included in an order and in minimal order information, in accordance with an embodiment of the invention.

FIG. 4 shows the type of data that may be included in an order 402 that is transmitted from a trader 404 to a local match engine 406 and in a minimal order 408 transmitted from a local match engine 406 to remote match engines 410 and 412. Order 402 may include a trader's name, trading firm name, account number, contract, price and quantity. Minimal order information 408 may include identifying information that uniquely identifies the order, such as a serial number, contract price and quantity. The use of minimal order information allows for the transmission of critical information between match engines while minimizing the consumption of bandwidth. During the execution of an order, the serial number or other identifying information may be used to obtain information that is included in an order, but not within minimal order information.

Figure 5:
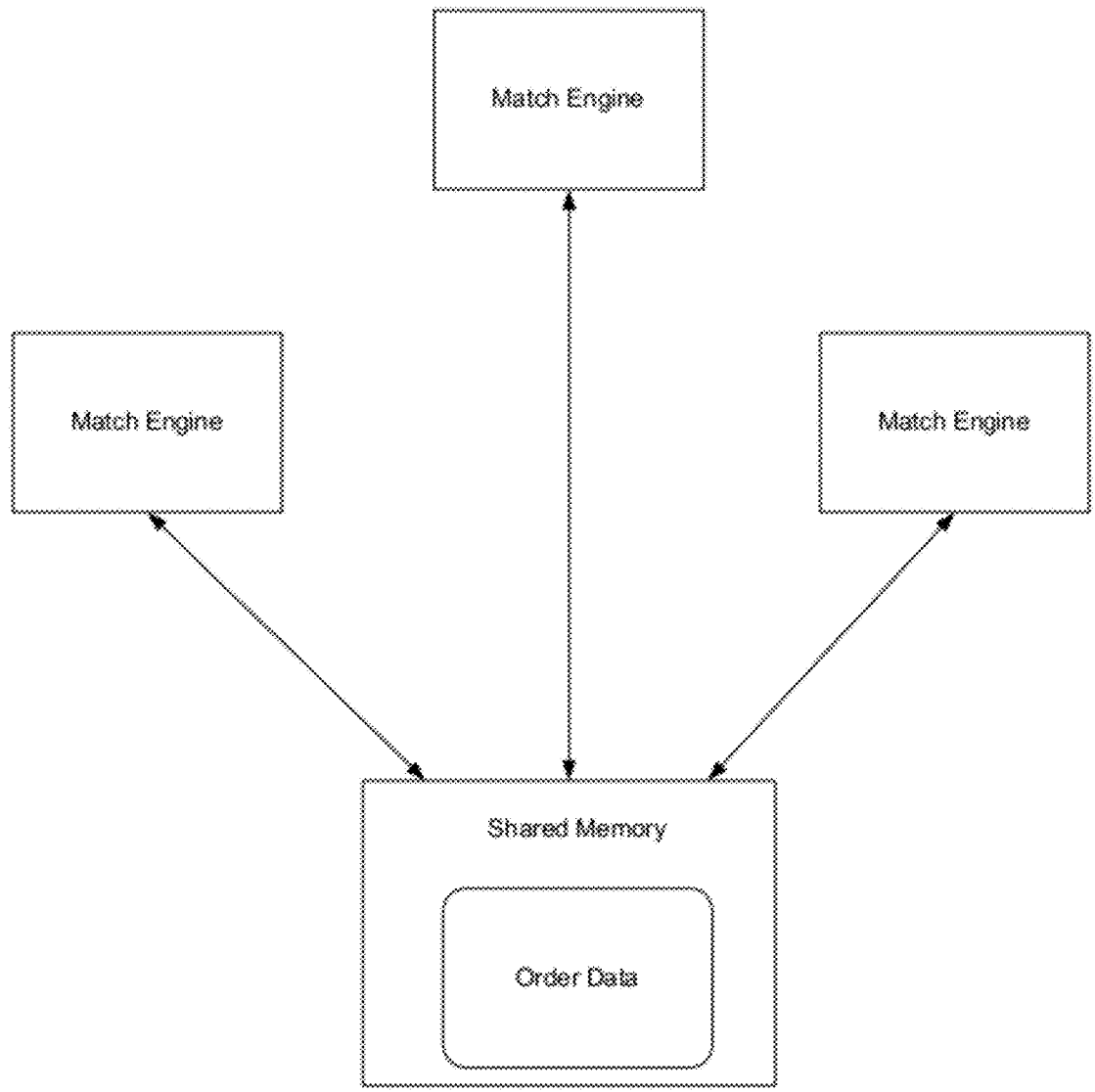
FIG. 5 illustrates a financial instrument order matching system that utilizes a shared memory in accordance with an embodiment of the invention.

FIG. 5 illustrates a financial instrument order matching system in accordance with an alternative embodiment of the invention. A shared memory 502 may be used to store order data 504. Instead of storing order data locally, match engines 506, 508 and 510, which may be geographically remote from one another, utilize order data 504 stored in shared memory 502.

One skilled in the art will appreciate that one or more reservation systems may be used to ensure that a single order is not matched more than once with the various embodiments described above. For example, if a match engine in Chicago is executing a process of matching a specific order, information identifying the state of the order may be distributed to match engines in London and Singapore to ensure that the later match engines do not attempt to match the order.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended exemplary aspects of the invention. All are considered within the sphere, spirit, and scope of the invention.

We claim:

1. A system configured to create an outward appearance of a single order book, the system comprising:
   a first match engine located at a first geographic location, wherein the first match engine is configured to match orders using a first order book;
   a second match engine located at a second geographic location remote from the first location, wherein the first match engine and the second match engine are not equidistant from a computer device transmitting an order, and wherein the second match engine is configured to match orders using a second order book; and
   a shared memory communicatively coupled, over a data network that connects the first match engine and the second match engine and is configured to carry status messages that synchronize at least one of: the first order book and the second order book, to the first match engine and the second match engine, wherein the first match engine is programmed to transmit, over the data network, minimal order information to the second match engine to determine that a best price available to match the order is at the second order book of the second match engine instead of at the first order book.

2. The system of claim 1, wherein a transmission delay associated with transmitting an order from a computer device to the first match engine is different than the transmission delay associated with transmitting an order from the computer device to the second match engine.

3. The system of claim 1, wherein the first match engine is programmed with computer-executable instructions, which when executed by a processor of the first match engine, cause the first match engine to:
   determine if a best price available to match the order for a financial instrument is at the first match engine or the second match engine;
   attempt to match the order with an order at the first match engine, if the determining identifies that the best price is available at the first match engine; and
   attempt to match the order with an order at the second match engine, if the determining identifies that the best price is available at the second match engine.

4. The system of claim 1, wherein the second match engine is programmed with computer-executable instructions, which when executed by a processor of the second match engine, cause the second match engine to:
   determine if the best price available to match the order for a financial instrument is at the first match engine or the second match engine;
   attempt to match the order with an order at the first match engine, if the determining identifies that the best price is available at the first match engine; and
   attempt to match the order with an order at the second match engine, if the determining identifies that the best price is available at the second match engine.

5. The system of claim 1, wherein the data network comprises a high speed fiber optic network.

6. The system of claim 1, wherein the data used to synchronize order books comprises status messages.

7. The system of claim 6, wherein the status messages are formatted in accordance with a protocol that uses out of band signaling, and wherein at least one of the status messages indicates a best bid and offer price for a financial instrument at a match engine.

8. The system of claim 6, wherein the first geographic location is local to a source of the order.

9. A distributed order matching apparatus that reduces transmission delays by physically positioning a plurality of match engines across a geographic area and establishing a synchronization protocol for the plurality of match engines, comprising:
- a computer memory storing at least computer-executable instructions and received orders;
- a processor configured to execute the computer-executable instructions to cause the apparatus to:
  - determine if a best price available to match a received order is at the apparatus or at a remote match engine, wherein the remote match engine is positioned at a geographic location different from that of the apparatus, and wherein the remote match engine and the apparatus are not equidistant;
  - attempt to match the received order with an order at the apparatus based on a determination that the best price to match the received order is available at the apparatus;
  - transmit, over a high-speed computer network, minimal order information to the remote match engine based on a determination that the best price to match the received order is not available at the apparatus; and
  - synchronizing the remote match engine using the minimal order information;
- wherein the apparatus is communicatively coupled over the high-speed computer network with the remote match engine; and wherein the distributed order matching apparatus provides an outward appearance of a single seamless order book.

10. The apparatus of claim 9, wherein the minimal order information comprises identifying information that uniquely identifies the received order.

11. The apparatus of claim 10, wherein the identifying information comprises a serial number.

12. The apparatus of claim 9, wherein the minimal order information further includes information identifying at least one financial instrument, a price, and a quantity.

13. The apparatus of claim 9, further comprising:
- a network card configured to communicate with the remote match engine via a high speed fiber optic data network.

14. The apparatus of claim 9, comprising further computer-executable instructions, which when executed by the processor, cause the apparatus to:
- create status messages; and
- send status messages to the remote match engine.

15. The apparatus of claim 14, wherein the status messages are formatted in accordance with a protocol that uses out of band signaling, and wherein at least one of the status messages indicates a best bid and offer price for a financial instrument at the apparatus.

16. The apparatus of claim 14, wherein the status messages indicates at least one of: a state of an order book stored in the computer memory, and change in the order book since a previous status message.

* * * * *